No. 618,893. Patented Feb. 7, 1899.
W. J. MILLER.
COMBINATION SCOOP AND SCALE.
(Application filed Dec. 28, 1897.)
(No Model.)
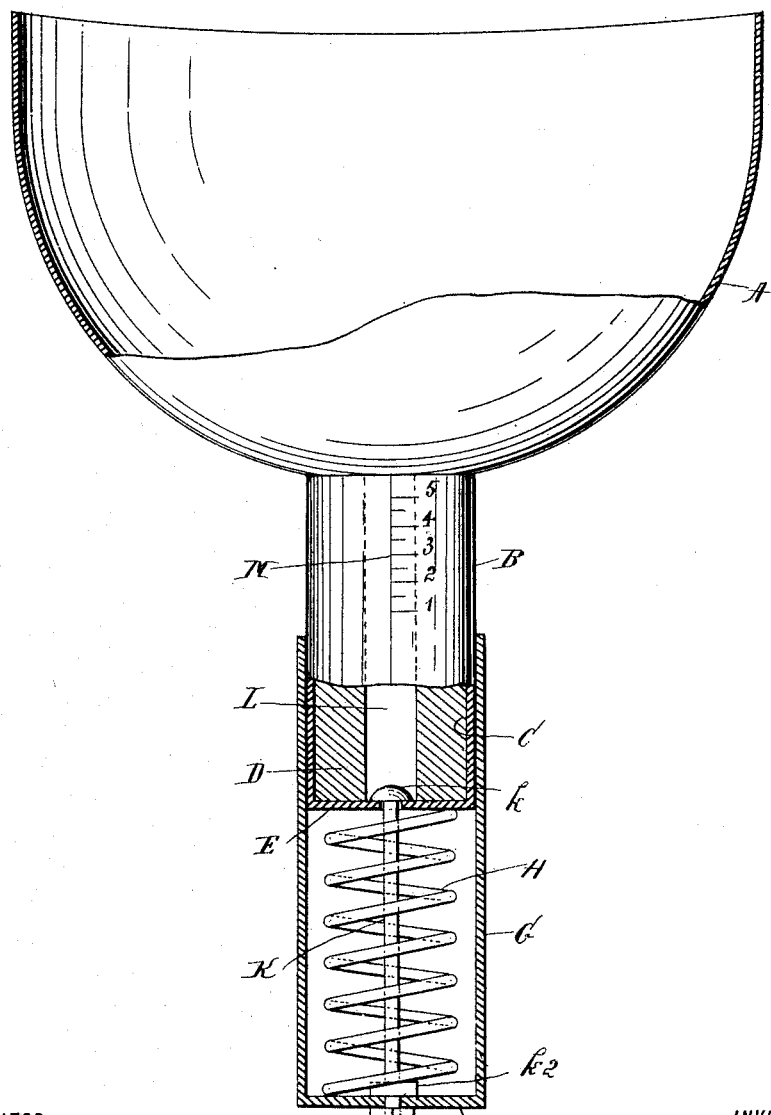
WITNESS
INVENTOR
ATTORNEYS

UNITED STATES PATENT OFFICE.

WALLACE JOSEPH MILLER, OF LOS ANGELES, CALIFORNIA.

COMBINATION SCOOP AND SCALE.

SPECIFICATION forming part of Letters Patent No. 618,893, dated February 7, 1899.

Application filed December 28, 1897. Serial No. 664,148. (No model.)

*To all whom it may concern:*

Be it known that I, WALLACE JOSEPH MILLER, a citizen of the United States, residing at Los Angeles, in the county of Los Angeles and State of California, have invented certain new and useful Improvements in a Combination Scoop and Scale, of which the following is a full and complete specification, such as will enable those skilled in the art to which it appertains to make and use the same.

This invention relates to scoop-scales for use by grocers and others; and the object thereof is to provide an improved device of this class which may be used as a combination scoop and scale and which is simple in construction and operation and also comparatively inexpensive.

The invention is fully disclosed in the following specification, of which the accompanying drawing forms a part, said drawing being a side view of my improved combination scoop and scale, part of the construction being shown in section.

In the drawing forming part of this specification the separate parts of my improvement are designated by letters of reference, and in the practice of my invention I provide a scoop A, which may be of any desired shape or form and which is provided with a cylinder or handle B, which is secured to the bottom or side thereof and which consists of a tubular casing C, composed of metal and in which is preferably placed a hollow cylindrical core D, which is preferably composed of wood, and the bottom of the casing C is closed by a plate E.

The cylinder or handle B is placed in a cylindrical or tubular casing G, in which it is free to slide and the upper end of which is open and the lower end thereof is closed by a plate $g$, and mounted in the cylindrical casing G is a spiral spring H, through which passes a bolt or rod K, the upper end of which passes through the bottom plate E of the cylinder or handle B and is provided with a head $k$, which is free to move in the central bore L of the core D, which is placed in the cylinder or handle B, and the lower end of the bolt or rod K passes through the bottom $g$ of the cylinder or tubular casing G and is provided within the bottom $g$ with a set-nut $k^2$ and outside of said bottom with a supplemental nut $k^3$.

The cylinder or handle B is provided with a scale M, which represents pounds and fractions thereof, and the operation will be readily understood from the foregoing description when taken in connection with the accompanying drawing and the following statement thereof.

The spring K is so gaged as to exactly measure the amount in the scoop A, and it will be understood that the scoop A may be used in the usual manner and the amount therein measured on the scale M, the upper end of the cylindrical or tubular casing G moving over said scale, as will be readily understood.

It will also be understood that the cylindrical or tubular casing G and the cylinder B constitute a complete handle for the device, and said device is in practice manipulated entirely by that part of the handle consisting of the cylindrical or tubular casing G in which the cylinder B moves.

It will also be observed that the head $k$ of the bolt or rod K prevents the separation of the cylindrical part B of the scoop from the cylindrical or tubular casing and also holds the upper end of the said cylindrical or tubular casing G in proper relation to the scale L, and my improvement is simple in construction and operation and is well adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A combination scoop and scale which consists of a scoop provided with a cylindrical attachment or shell C, provided with a scale on the outside thereof and on the inside with a tubular core D, beneath which the attachment or scale-shank of said scoop is provided with a bottom E; a tubular casing G closely surrounding and adapted to slide on the shank or attachment C, a spiral spring between the bottom plate E and the lower end of the casing G, said spring being of a length to hold the scoop normally elevated to the proper position by expansion, a rod or shaft K secured to the bottom of the casing G, and having its upper end inserted loosely through the bottom plate E of the scoop-shank and provided with a head $k$ which is substantially of the diameter of the bore of core D, whereby the engagement of the bottom plate E with the rod K, and the engagement of said head $k$ with the bore of the core D, causes an accurate and true vertical movement of the scoop-shank against the expanding spring A; the lower end of the rod K being provided with a set-nut $k^2$ bearing against the inside of the bottom of the casing G, and with securing means upon the outside thereof whereby when the rod is secured exteriorly the set-nut $k^2$ and the head $k$ initially hold the exterior casing and the scoop-shank in proper vertical alinement, substantially as shown and described.

2. A combination scoop and scale, consisting of a tubular casing which is open at one end and closed at the other, and which is adapted to serve as a handle, and as a pointer for the scale, a scoop provided with a cylindrical attachment, one end of which is secured thereto or connected therewith, and the other end of which is adapted to enter a slide in the open end of said casing, said cylindrical attachment being provided with a central longitudinal bore, and the free end thereof with a plate by which said bore is closed, a rod passing through the closed end of said casing, and through said plate and provided with a head which is adapted to move in said bore, a spiral spring mounted in said casing and inclosing said rod, one end of which bears on the closed end of said casing, and the other on the end of said cylindrical attachment or the plate secured thereto, said cylindrical attachment being also provided on one side thereof with a longitudinal scale, substantially as described.

In testimony that I claim the foregoing as my invention I have signed my name, in presence of the subscribing witnesses, this 14th day of December, 1897.

WALLACE JOSEPH MILLER.

Witnesses:
WILLIAM BYRON SCARBOROUGH,
THOS. HAMBROOK.